Oct. 31, 1933.  A. J. DOTTERWEICH  1,933,369
WATER SOFTENING APPARATUS
Filed Jan. 17, 1930
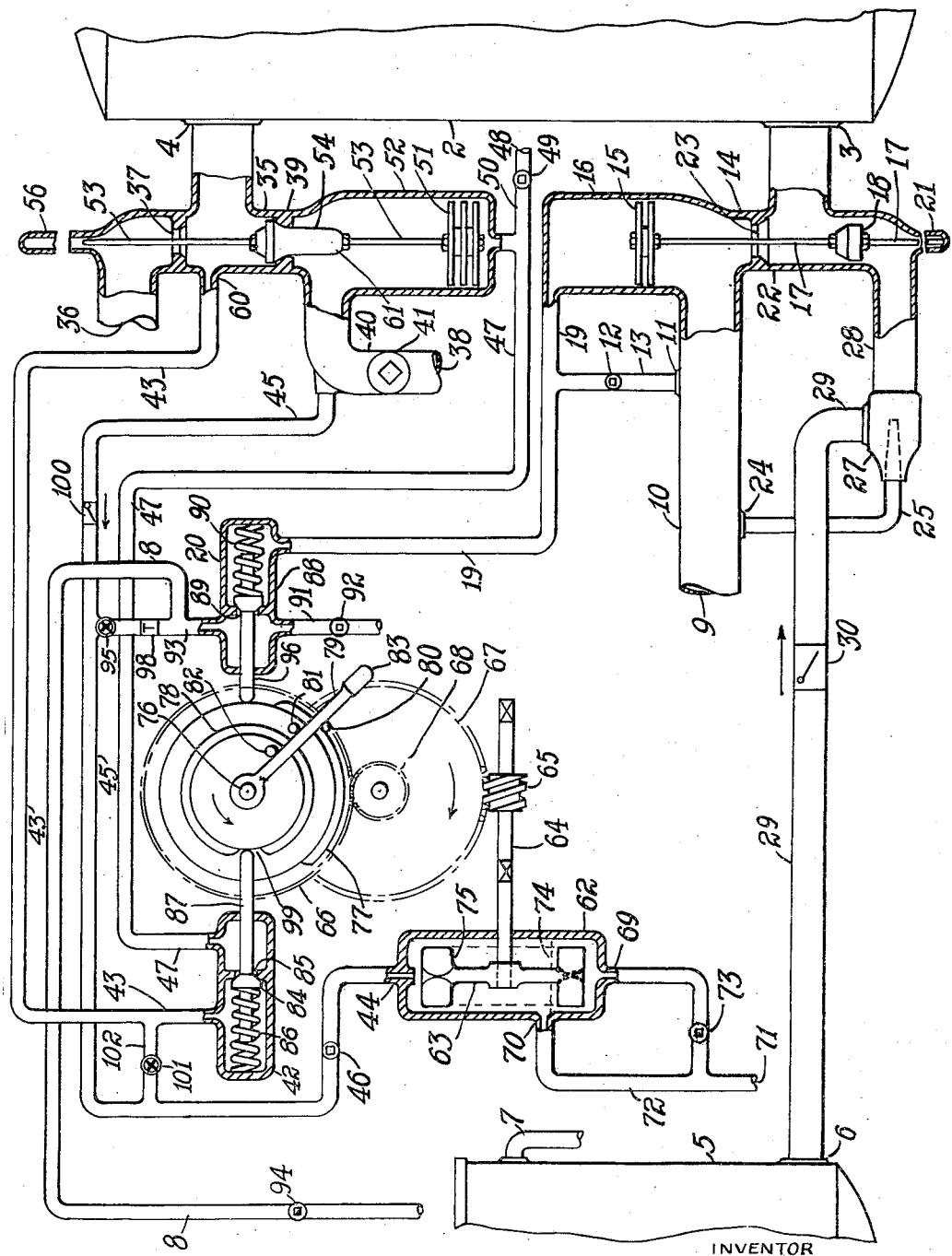
INVENTOR
Andrew J. Dotterweich Patented Oct. 31, 1933

1,933,369

UNITED STATES PATENT OFFICE 1,933,369

WATER SOFTENING APPARATUS

Andrew J. Dotterweich, Pittsburgh, Pa., assignor to Automatic Water Softener Company, Pittsburgh, Pa., a corporation of Delaware Application January 17, 1930. Serial No. 421,469

8 Claims. (Cl. 210—24)

This invention relates to a complete water softening apparatus of the type embodying a zeolite or water softening material as a means to soften water and which is adapted to be regenerated at intervals.

It is among the objects of this invention to provide a water softening apparatus adapted to be self-regenerative after the regeneration is initiated by a manual means.

Another object of this invention is to provide a water softening apparatus of the self-regenerating type which is of a simple and inexpensive construction, positive in operation and requiring a minimum number of operating parts.

Another object of this invention is to provide a water softening apparatus of the self-regenerating type which is adapted to use the fluid flowing from the apparatus to assist in controlling the operation thereof.

These and other objects of the invention will become more apparent from consideration of the accompanying drawing and specifications in which like reference characters designate like parts and in which the character 2 designates a tank containing material for softening water having a fluid inlet connection at 3, a fluid outlet connection at 4, and is of a construction within as is familiar to those skilled in the art.

The tank 5 contains regenerating material in fluid form, sufficient for several regenerations, has an outlet connection 6, an overflow at 7, is refilled with water thru the piping 8 and has within it the familiar gravel and necessary fittings.

Leading from a suitable source of water supply at 9, piping 10 has connection at 11 with by-pass piping 13, leading to piping 19, at 24 with piping 25 leading to the ejector 27 and with a valve controlling the flow of fluids to the inlet 3, designated generally by the character 14.

The valve 14 consists of a piston 15 which is loosely fitted in the cylinder 16 and has connection by the stem 17 with the valve member 18. In the upper end of the cylinder 16 by means of piping 19, connection is made with the by-pass 13 and the casing 20 of a pilot control valve.

The stem 17 extends thru the member 18 into a guide 21 in a manner which will hold member 18 in a central position so that it can pass easily to the valve seat 22 with the valve 14 in operation.

The valve 14 is of the type described in a previous application filed July 1, 1927 Serial #202,842, is operated by causing a flow of water around the piston 15 and is illustrated in its normal or inactive position. If it is desired to operate this valve 14, a pilot valve in the piping 19 is opened which permits an unbalanced pressure to exist against the sides of the piston 15 caused by the water flowing from the inlet piping 10, around the piston 15 and thence discharging thru piping 19. Such pressure of water around the piston 15 causes it to move upwardly, drawing the member 18 to its seat 22 by the stem 17 to close the port 23 and thus place the valve 14 in the operating position.

Upon closing the discharge from the cylinder 16, thru piping 19, water pressure on both sides of the piston 15 becomes equalized and accordingly with the removal of the actuating force, the piston 15, stem 17 and member 18 move by gravity to the lowered or normal position.

In practicing this invention, I have found that the lowering by gravity of these members 15, 17 and 18 is quite slow due to a dash-pot effect of the piston 15 in the cylinder 18 causing a chattering or vibration of these parts until they have passed substantially to the normal position. To overcome this difficulty, a by-pass is placed leading from the piping 10 thru piping 13, choke 12 and thence connecting to piping 19. Assuming a pilot valve in piping 19 as closed, a restricted flow of water passes from piping 10 thru piping 13 to the cylinder 16 in quantity sufficient to cause a downward pressure on the upper side of the piston 15 and thus hasten its drop. The choke 12 has an effective area as will permit sufficient water to pass into the cylinder 16 above the piston 15 to overcome the vibration referred to above and further during a period when the valve 14 is in operation, will restrict the flow of water thru piping 13 so that there will be a flow of water upwardly around the piston 15 to a discharge outlet in piping 19 and the pressure in piping 19 will be low enough to operate the valve 14.

Leading from the inlet piping 10, water flows thru a connection 24, piping 25, to an injector 27. This injector 27 has connection by piping 28 to the valve 14 as well as to the brine tank 5 by piping 29, check valve 30 and connection 6.

During the water softening and washing periods, the pressure within the softener tank 2 and valve 14 exceeds the pressure at which the injector will operate and accordingly the check valve 30 remains closed.

Assuming a discharge to the drain from tank 2 thru outlet 4 is open, operation of the valve 14 closes the port 23 causing a back pressure to exist in the piping 10, removes substantially all the pressure from the tank 2 and causes a flow of water at high pressure to pass thru piping 25 to ejector 27, thereby drawing a brine solution from the brine tank thru piping 29 and check valve 30 for discharge with the ejector water into piping 28, valve 14 and thence thru connection 3 to the softener tank.

At the connection 4, a valve generally designated by the character 35, has connection with a point of use at 36 thru the port 37, with a drain at 38 thru port 39, piping 40 and choke 41, with the casing 42 of a pilot control valve thru piping 43, with the nozzle 44 of a controlling fluid motor thru piping 45, check valve 100 and choke 46, with the casing 42 of a pilot control valve thru piping 47 and with a point of discharge to atmosphere at 48 thru choke 49 and piping 50.

Within the valve 35, a loosely fitting piston 51 operates in the cylinder 52 and has connection by a stem 53 with a compound or double acting member 54. This member 54 in the lowered position, as illustrated, closes the port 39 leading towards the drain and control equipment, permitting the flow of water from the softener tank 2 to pass through the connection 4, port 37, and thence to use at 36. In the upper position, this member 54 closes the port 37 and opens the port 39 so that fluids can pass from the softener 2 thru connection 4, port 39 to the drain and control equipment.

The stem 53 extends thru the member 54 to a guide 56 for purpose of support and to assist in holding the member 54 centrally.

The valve 35 is of the type which is operated by the flow of a fluid around the piston 51 and in its inactive or normal position, as illustrated, is with the drain port 39 closed and the soft water port 37 open. If it is desired to operate this valve 35, a fluid pressure thru the piping 47 is applied to the piston 51, which, by the stem 53 and member 54, causes the drain port 39 to be opened and the soft water port 37 to be closed.

The fluid pressure and flow for actuating the piston 51 and member 54 from the normal position is derived thru a connection at 60 leading thru piping 43 to the casing 42 of a pilot control valve and thence thru piping 47 to the cylinder 52 on the lower side of the piston 51, thence upwardly around the piston 51 to the drain at 38 thru the piping 40 and the choke 41.

It will be observed that the port 39 is of a restricted area which is for purpose of causing a greater pressure to exist above the nozzle 39 when a flow of fluid is passing thru the port 39 to the drain and thus cause an operating pressure or flow to pass thru the connection 60 to the under side of the piston 51 and thus retain the drain port 39 open.

If it is desired to close the drain port 39 and open the port 37, the flow of fluid to the under side of the piston 51 is discontinued. On account of the restricted port opening 39, an internal pressure exists within the valve 35 above the port 39 which holds the member 54 together with the stem 53 and piston 51 in the upper position i. e. the internal pressure holds the member 54 against the seat 37.

As a means to insure the closing of the port 39 and the opening of port 37, a connection by the piping 50 directs the flow of fluid from the cylinder 52 to a point of discharge at 48 thru the nozzle 49, and further in the drain piping 40, a choke 41 serves to create a pressure within the valve 35 below the port 39 and above the piston 51 as will cause an unbalanced pressure to exist on the upper side of the piston 51 and thus this internal pressure causes fluid to pass downwardly around the piston 51, to discharge at 48, forcing the member 54 from its seat 37 and inserting the nose 61 of the member 54 into the nozzle 39. Having removed the member 54 from the seat 37 and with the nose 61 of the member 54 in the port 39, the pressure in the cylinder 52 is substantially removed and accordingly less water passes downwardly around the piston 51, however, with the port 39 partially sealed, the internal pressure within the valve 35 above the port 39 now acts on the upper side of the member 54 forcing it downwardly together with the stem 53 and piston 51 to the normal or inactive position of the valve 35, permitting the cylinder 52 to act as a dash-pot to insure the gradual and easy closing of the valve without shock or water hammer.

It is quite obvious that during the period when a fluid is passing to the cylinder 52, some fluid will pass thru piping 50 to discharge at 48 and accordingly the choke 49 should have an opening which will not materially affect the pressure of a fluid flowing upwardly in the cylinder 52 and thereby permit the closing of the valve 35.

During the period of regeneration, the choke 41 further serves to cause sufficient back pressure in the drain piping 40 as will force a flow of fluid thru the piping 45, check valve 100, choke 46 and nozzle 44 leading to a fluid motor operating as a means for controlling the various operations of regeneration and restoration to service of a water softening apparatus.

Heretofore, it has been practice to manufacture water softening equipment of the self-regenerative type embodying a water meter or an electric motor as a means for operating the controlling valves thru a long train of gears for purpose of securing a complete cycle of regeneration.

Inasmuch as the time required for regeneration is quite prolonged, such equipment of cams and gears lead to many complications both as to manufacture and as to operation and accordingly to overcome such difficulties, this invention provides a means for using a fluid in a manner which will simplify both the manufacture and operation thereof.

Housed in a suitable casing 62, an impeller or fluid motor wheel 63 is so positioned as to receive the discharge of a fluid from the nozzle 44 for transmission of this force in the turning of a shaft 64, a worm gear 65 and thence a gear 66 thru the gears 67 and 68. The housing 62 is provided with a plurality of outlets 69 and 70 for carrying the fluid to a point of discharge at 71 thru the piping 72. In the path of flow from the outlet 69, a choke 73 serves to restrict the flow thru this path for a purpose hereinafter referred to and for purpose of retarding the turning of the impeller wheel 63, so adjusted that there will be a volume of water within the casing 62 during the complete cycle of regeneration as will maintain the level indicated by the character 74 or of sufficient depth whereby the kinetic force of the incoming fluid thru the nozzle 44 will be absorbed by the blades 75 passing therethru and thus reduce the speed of the impeller wheel to limits of speed as overcome the necessity for a long train of gears.

During the periods of salting and washing of the softening material, a briny solution will pass from the softener tank 2 to the drain at 38 as well as thru the piping 45, check 100, choke 46 and nozzle 44 for operation of the fluid motor and thence to the discharge 71 thru outlets 69 and 70. This briny solution has a specific gravity greater than that of water and accordingly advantage is taken of this fact to further reduce the speed of rotation of the impeller wheel 63 by greater resistance to rotation offered when the blades 75 pass thru the volume of briny solution in the casing 62 having an upper level at 74.

In the path of flow from the outlet 69, an adjustable nozzle serves to determine the division of flow from the casing 62 thru the outlets 69 and 70. In the instance where it is desired to shorten the periods of salting and washing, the cross sectional area of the opening in the choke 73 is increased and thus permits the briny solution to pass from the casing 62 quickly. If it is desired to lengthen out the periods of salting and flushing, the cross sectional area of the opening in the choke 73 is decreased so that as a briney fluid passes into the casing 62, the greater part passes directly to the outlet 70 and the lesser part passes towards the outlet 69, causing a delay in the removal of the briney solution from the casing 62, with the consequent longer period of operation.

Operation of the valves 14 and 35 is thru means of pilot valves arranged to be actuated by gears and cams controlled by a fluid motor after initiation of operation has been effected by a manual means or otherwise.

On a common shaft 76, the gear 66, cam members 77 and 78 and the lever arm 79 are placed, each independently free to rotate except for the pins 82, 81 and 80 attached to the cam members 78, 77 and the gear 66 respectively.

In the casing 42, a pilot valve member 84 operated by the cam member 78 thru the stem 87 from its seat 85 serves to control and open the valve 35 whereas the spring 36 operates to seat the valve member 84 against its seat 85 when the stem 87 has passed from the cam 78 and thus close the valve 35.

In the casing 20, a pilot valve member 88 operated by the cam 77 thru the stem 96 from its seat 89 serves to control and operate the valve 14, whereas the spring 90 operates to seat the valve member 88 against its seat 89 when the stem 96 has passed from the cam 77 and thus render the valve 14 inoperative.

Leading from the casing 20, piping 93 directs the flow of water operating the valve 14 thru piping 8 to the brine tank 5 for purpose of replacing the volume of brine solution being withdrawn from the brine tank 5 during the period of brine application. Connection is also made by piping 93 thru the valve 95 and the check valve 98 to piping 45 leading to the nozzle 44 of the fluid motor. For reason of a greater pressure existing in the pipe 93 during the salting operation than exists in the piping 45, a check valve 100 placed in the piping 45 serves to prevent a back flow of water thru piping 45 to the drain pipe 40.

In the piping 93 connecting with the piping 45, a check valve 98 serves to prevent a flow of fluid during the washing period from the piping 45 thru the casing 20 to a point of discharge by the piping 91. The connection piping 91 controlled by the choke 92 serves as an outlet for water in excess of the requirements of operation for the fluid motor or for refill water in the brine tank 5.

If desired, the valve 95 provides a means whereby during the salting period, water at higher pressure or in greater volume can pass to the nozzle 44 of the fluid motor to hasten the operation of salting or the valve 95 can be throttled and set at points to zero opening and thus secure a variable control of the salting period. Incidently, with the valve 95 closed, the actuating force for operating the control mechanism is thus derived entirely by the fluid passing from the tank 2.

Rotation of the impeller wheel 63 is by the fluid which passes thru the nozzle 44. During the period of water softening, the cams 77 and 78 cause the valve members 88 and 84 to be closed and accordingly, the flow of fluid to the nozzle 44 is interrupted. Connecting piping 43 and 45, a by-pass connection 102 controlled by the valve 101 serves as a means to direct a flow of water thru piping 45, choke 46 and nozzle 44 to the impeller wheel 63.

The valve 101, may be either the hand operated or remotely electrically controlled type and is left open until the rotation of the impeller wheel has caused the cam 78 to open the port 85, rendering the apparatus self-operative, after which the valve 101 is closed.

If desired, regeneration may be initiated by moving the handle 83 of the lever arm 79 in a counter clockwise direction until the lever arm 79 has moved the cam members 77 and 78 by the pins 81 and 82 into a position where the cam 78 has opened the valve port 85 by the stem 87 and valve member 84.

The opening of the valve port 85 causes water to pass from the connection 60 thru piping 43, to the casing 42, thence thru the opened valve port 85, thence from the casing 42 thru piping 47 to the cylinder 52 of valve 35, causing the piston 51 by member 54 to open the port 39 and close the port 37. The opening of port 39 causes water to pass to the drain at 38 as well as thru piping 45, check valve 100, choke 46 and nozzle 44 actuating the impeller wheel 63. Rotation of the impeller wheel 63 causes the gear 66 to rotate by the gears 65, 67 and 68 in a manner as brings the pin 80 in contact with the lever arm 79 and thence thru the lever arm 79, rotation of the cam members 77 and 78 is effected by the pins 81 and 82, causing the cam 77 to pass under the stem 96 and thus open the valve 88 to initiate the salting operation.

Incidently, if the salting operation is to be effected substantially simultaneously with the initiation of regeneration, the lever arm 79 can be moved to a position manually where the cam 77 is in position to open the valve 88 and then the rotation of the impeller wheel 63 will continue the operations of regeneration.

Rotation of the gear 66 and cam members 77 and 78 is continuous as long as a fluid is passing to the fluid motor and accordingly provision is made by a break 99 in the cam member 78 which by the rotation thereof will close the valve 84 by this break and thus terminate the operation of the fluid motor by removal of the actuating force.

The length of the cam 77 and the rate of rotation of it serve to determine the time interval necessary for the salting operation whereas the length of the cam member 78 from point thereon as corresponds to the point of termination of the salting operation to the point where the stem 87 passes from the cam 78 together with the rate of rotation of it serve to determine the time interval necessary to complete the washing of the brine from the softening material.

Assuming the softening material is exhausted, initiation of the regeneration cycle is effected by either opening the valve 101 until the flow of water to the fluid motor has caused the valve 84 to open or by moving the handle 83 of the lever 79 in a counter clockwise direction until the cam member 78 has opened the valve 84.

Either of the above methods cause water to pass to and continuously rotate the impeller wheel 63 until the valve port 85 is closed by the break 99 in the cam 78, on completion of the regeneration cycle with the apparatus restored to service.

The opening of the valve port 85 causes the valve 35 to open to the drain and to close the path of flow leading to a point of use. As the valve port 89 becomes opened, water flowing thru valve port 89 actuates the valve 14 from the normal position and incidently causes a salt solution to pass to the ejector 27 and thence to the softener thru the connection 3 as well as water to refill the brine tank 5.

The salting operation continues until the rotation of the cam 77 causes the stem 96 to pass therefrom with the cam 78 retaining open the valve port 85 to initiate the period of washing.

The continued rotation of the cams 77 and 78 during the washing period finally causes the stem 87 to pass from the cam 78 at the break 99 and close the valve 84.

The closing of the valve 84 terminates the flow of fluid to the cylinder 52, removing the pressure from the lower side of the piston 51 which then by the member 54 closes the port 39 and opens the port 37 as heretofore explained. The closing of the port 39 removes the actuating force of water from the fluid motor which then stops rotation and permits the drainage of fluid from the casing 62 thru the outlet 69.

By describing and illustrating herein what I consider to be the preferred embodiment of apparatus suitable for practicing the invention, I do not thereby suggest or intend that the invention is limited in its application, or that the solicited claims are to be narrowed in their interpretation to any details not specifically referred to therein, for it is reasonably expected that those skilled in the art, may by advantage of the principles involved in this disclosure of apparatus, use methods of procedure perhaps dissimilar in appearance and arrangement but nevertheless within the scope of the invention and therefore desire to comprehend within my invention such modifications as may be necessary to adapt it to varying conditions and uses.

I claim:

1. A water softener through which water to be softened normally flows to a service connection, having means for introducing water and regenerating solution thereto, a control valve controlling said means whereby water is normally caused to be supplied to the softener, the valve being operable to cause regenerating solution to be supplied, a drain connection, a control valve whereby the softener is normally caused to discharge to the service connection but operable to effect interruption of the discharge to service and cause such discharge to the drain, a rotary motor arranged to be actuated by fluid flowing from the softener when the softener discharges to the drain, and means driven by said motor and controlling said valves to cause initiation of and a flow through the softener to the drain or regenerating solution and an ensuing flow of wash water through the softener to the drain, the first mentioned valve being controlled by said motor driven means to initiate the flow of regenerating solution to the softener and subsequently to terminate such flow at a period determined by the motor, and the second mentioned valve means being controlled by the motor to effect termination of the discharge from the softener to the drain and restoration of the discharge to service at a period determined by the motor subsequent to the period of terminating flow of regenerating solution to the softener.

2. A water softener having connection with a source of water and a service connection to which the softener normally discharges, means to supply regenerating solution to the softener including a valve operable to cause the operation of said means, a drain connection, a valve operable to interrupt the discharge to service and cause the softener to discharge to the drain connection, and a controlling mechanism having means to initiate action of said mechanism, said mechanism including a rotary motor arranged to be actuated by flow from the softener when discharging to the drain connection, said mechanism being automatically operable pursuant to initiation of its action to cause operation of the valves as required for flowing regenerating solution to the softener with accompanying discharge from the softener to the drain and thereafter, under control of the motor, to cause a valve operation to stop the flow of regenerating solution to the softener and a subsequent valve operation to terminate the discharge to the drain and restore the normal discharge to the service connection.

3. A water softener having connection with a source of water and a service connection to which the softener normally discharges, means to supply regenerating solution to the softener including a valve operable to cause operation of said means, a drain connection, a valve operable to interrupt the discharge to service and to cause the softener to discharge to the drain, a rotary motor operated by flow from the softener, a starting valve by which flow from the softener may be directed to the motor, and means controlled by said motor for operating the aforesaid valves as required for flowing regenerating solution and wash water through the softener to the drain during intervals determined by the motor and then for restoring the normal flow to service and closing the starting valve.

4. A water softener having connections for supplying water and regenerating solution, a valve controlling said connections, service and drain connections, a valve controlling said service and drain connections, said valves being normally in position for flow of water through the softener to service and being hydraulically operable to shift their positions, pilot valves controlling application of pressure to shift the main valves, a fluid motor operable by liquid flowing from the softener, means driven by said motor controlling said pilot valves, the construction permitting initial opening of one of said pilot valves whereby to cause the shifting of the valve controlling the delivery connections of the softener so as to cause the softener to discharge to the drain, the motor being arranged to be actuated by liquid flowing from the softener when discharging to the drain, said motor-driven means operating to open the second pilot valve and hold it open for a determined interval so as to cause shifting of the valve controlling the liquid supply connections of the softener and maintain its shifted position for a corresponding interval, during which interval regenerating solution flows through the softener to the drain, and said motor driven means maintaining the first pilot valve open from the time it is initially opened until a determined interval after the closing of said second pilot valve and then causing the same to close, whereby pursuant to the initial opening of the first pilot valve the softener passes automatically through regeneration and flushing and resumes normal softening operation.

5. An apparatus as set forth in claim 4 wherein the motor driven means comprises a gear having an axle, cams for the respective pilot valves loose on said axle, a lever handle loosely mounted on said axle, a pin on said gear engaging said handle and by which said handle is driven to revolve with the gear, and pins on said cams engaged by said handle for driving the cams by the revolving handle, whereby the handle may operate the cam associated with the first pilot valve as required for initially opening the same.

6. A water softener having connections for supplying water and regenerating solution, a valve controlling said connections, service and drain connections, a valve controlling said service and drain connections, said valves being normally in position for flow of water through the softener to service and being hydraulically operable to shift their positions, pilot valves controlling application of pressure to shift the main valves, a fluid motor arranged to be actuated by liquid flowing from the softener when discharging to the drain, a by-pass connection between said motor and the softener including a normally closed valve by opening which liquid may be initially supplied to the motor to start its operation while the softener is discharging to service, and means driven by the motor controlling said pilot valves, said motor driven means operating to open first the pilot valve for the main valve which controls the discharge connections of the softener and then to open the pilot valve for the main valve which controls the inlet connections and to hold said pilot valves open for determined intervals, the first opened pilot valve being maintained open for a substantially longer time than the second opened pilot valve, whereby said main valves are shifted one to cause the softener to discharge to the drain and the other to cause admission of regeneration solution to the softener and after a controlled period the latter is reshifted to cut off the supply of regeneration solution and restore the flow of water to be softened to the softener and after a subsequent controlled period the valve controlling the discharge connections is reshifted to close the drain connection and reopen the service connection.

7. In an apparatus of the class described, a closed softening tank in connection with a source of water under pressure, said tank having a normally open service connection and a normally closed drain connection, valve means controlling said service and drain connections, a piston connected to said valve means, a piston chamber to which pressure is admitted to cause a shifting of the valve means to position closing the service connection and opening the drain connection, piping for conducting water under pressure from the delivery end of the softener to said chamber, said piping having a normally closed pilot valve whereby flow to said chamber is normally prevented, a motor arranged to be operated by flow of liquid from the softener when discharging to the drain, said pilot valve adapted to be opened to permit delivery of pressure of fluid to said piston chamber with consequent shifting of said valve means and discharge to the drain and consequent operation of the motor by liquid so discharged, and means driven by said motor controlling said pilot valve to be open for a time determined by the motor and then to close with consequent stoppage of the motor and closing of the piping for conducting liquid to said piston chamber, the valve means adapted to resume normal position when the supply of pressure fluid thereto is cut off.

8. An apparatus as set forth in claim 7 having means to supply regenerating solution to the softener, a valve normally preventing admission of regenerating solution to the softener, a piston connected to said valve, a chamber for said piston, the piston being exposed to pressure in the system on both sides and adapted by the balancing of pressure to sustain the valve in its normal position, a pipe connected with said chamber for releasing pressure therefrom at one side of the piston, a normally closed pilot valve in said pipe, said motor controlling said pilot valve to open and remain open for an interval determined by said motor and then to close, which interval is only a portion of the interval during which the pilot valve mentioned in the preceding claim is maintained open, whereby regenerating solution is caused to be supplied to the softener during a part of the time that the softener is discharging to the drain.

ANDREW J. DOTTERWEICH.